Patented Aug. 8, 1933

1,921,539

UNITED STATES PATENT OFFICE 1,921,539

CHEMICAL PULPING PROCESS

George A. Richter, Berlin, N. H., assignor to Brown Company, Berlin, N. H., a Corporation of Maine No Drawing. Application October 27, 1931
Serial No. 571,461

2 Claims. (Cl. 92—9)

This invention relates to the pulping of raw cellulosic materials by the use of chemical cooking liquors of a composite nature, that is, containing more than one pulping chemical and which conduce to a raw pulp possessing not only good physical properties but easily bleachable into a white, high grade papermaking material.

I have found that certain raw cellulosic materials are amenable to pulping under the proper temperature and pressure conditions in a plain solution of sodium carbonate. So-called raw rope stocks, like manila, sisal, and ramie, can so be pulped, but the resulting product, although possessed of good physical qualities, is difficultly bleachable by ordinary methods. I have found that the addition of substantial amounts, say at least about 1%, of other pulping agents, and more especially sodium sulphide and/or sodium sulphite, is highly advantageous to a sodium carbonate cooking solution, itself containing at least about 1% of sodium carbonate, for these added agents conduce to a pulp possessed of both excellent physical characteristics, including strength and tear resistance, and easy bleachability. Evidently these additional agents are especially effective in removing ligneous and other coloring matter from the raw material, so that the resulting pulp needs comparatively little bleaching agent to be rid of its residual coloring matter. While the present invention comprehends the pulping of various raw cellulosic materials, such as wood, it is of value more especially when applied in the pulping of rope stocks, such as manila, sisal, and ramie, which are notably difficult to convert into easily bleachable raw pulps. Apart from the value of the cooking liquors of the present invention in the production of high grade, easily bleachable pulps, their composition is such that recovery of the valuable chemical content present in the spent cooking liquors is comparatively easy and economical. Thus, a liquor containing sodium carbonate and sodium sulphide, after being spent, not only lends itself to the recovery operations usually practised in a kraft mill, but with no need of lime in treating the recovered chemicals. After being separated from the raw pulp by washing, the spent liquor can be concentrated in evaporators and then delivered to smelting furnaces operated under reducing conditions and wherein the organic content is burned and the inorganic content is converted into a smelted mixture of sodium carbonate and sodium sulphide. The smelted mixture can be dissolved in water to form a fresh cooking liquor which, after clarification by filtering or settling of solid impurities, is suitable for direct use in the pulping of other raw cellulosic material. The elimination of the step of causticizing the smelt solution with lime means that the liquor is completely free from calcium salts, which, if present even in small amount, interfere with the most efficient evaporation and recovery of chemicals from the spent liquor. In the event that sodium sulphite is present in the cooking liquor, the smelt will also consist of sodium carbonate and sodium sulphide, as the sodium sulphite is reduced to the sulphide in the reducing atmosphere of the smelting furnace. The hot, smelted mixture can be delivered into water in such amount that the resulting hot solution, when cooled, becomes supersaturated with sodium carbonate so that this chemical crystallizes out from the solution, while the sodium sulphide remains dissolved therein by virtue of its much higher solubility. The crystallized sodium carbonate may be removed from the mother liquor and then treated with sulphur dioxide and water to form sodium sulphite, which can be added to the mother liquor to form a cooking liquor containing sodium carbonate, sodium sulphide, and sodium sulphite as the pulping chemicals. By using the appropriate amount of water in forming the hot smelt solution and/or by cooling to the desired low temperature, the fraction of sodium carbonate crystallized out and then converted into sodium sulphite for admixture with the mother liquor may be controlled to produce a cooking liquor of the desired sodium sulphite and sodium carbonate content. As in the kraft process, the chemicals used for replacing sodium and sulphur losses in the cycle and for adjusting the sulphidity in the smelt may be salt cake ($Na_2SO_4$), sodium carbonate and sulphur, or the like. These chemicals can be added to the smelting furnace, although some or all of the sodium carbonate may be added directly to the smelt solution and thus serve as part of the carbonate content of the cooking liquor.

A specific example of pulping raw manila fiber, for example, in accordance with the present invention, may be somewhat as follows. The raw stock is charged into the usual alkaline type of digester, along with the desired amount of cooking liquor containing, say, about 3% sodium carbonate and about 2% sodium sulphide. The digester is then closed and the charge is cooked for about four hours, at a temperature of about 335° F., at the end of which time a strong, long-fibered pulp, easily bleachable to whiteness, is secured. The pulped material may be washed and then bleached to the desired white color with a hypochlorite bleach liquor containing only about 5% calcium hypochlorite, based on the weight of dry fiber.

Some of the sodium carbonate and/or some or all of the sodium sulphide in the specific cooking liquor hereinbefore described may be replaced by sodium sulphite, which, like sodium sulphide, acts as a good delignifying agent, more especially for raw manila, sisal, ramie, or the like. Thus, the cooking liquor may be one containing about 2% sodium carbonate, 2% sodium sulphide, and about 1% sodium sulphite. Or sodium sulphite may be added to the cooking liquor, so that it contains about 3% sodium carbonate, about 2% sodium sulphide, and about 2% sodium sulphite, which latter chemical enhances the fiber-liberating ability of the liquor.

The use of sodium carbonate as an active alkali in the cooking liquor makes possible fiber liberation at temperatures not exceeding about 335° F. in a reasonably short period of time, especially in the case of raw cellulosic materials of the nature of manila, sisal, and ramie. Apart from the economies realized in the recovery operations, the use of sodium carbonate rather than caustic soda in the cooking liquor makes for a higher yield of a pulp which is convertible into papers having higher tear resistance and folding endurance. The resulting pulp is of higher pentosan content than would be the case were caustic soda used in place of sodium carbonate, as caustic soda is more active in removing pentosan groups than sodium carbonate, sodium sulphide, and/or sodium sulphite. In other words, the use of a cooking liquor in which sodium carbonate, sodium sulphide, and/or sodium sulphite are the essential fiber-liberating chemicals is advantageous when it is desired to retain as much of the pentosan groups as possible in the resulting pulp, as the pentosan groups evidently impart better physical or papermaking qualities to the pulp.

What I claim is:

1. A process which comprises cooking raw manila fiber for about four hours at a temperature of about 335° F. in a liquor containing about 2% to 3% sodium carbonate and about 2% sodium sulphide, thereby producing a strong, long-fibered, easily bleachable pulp.

2. A process which comprises cooking raw manila for about four hours at a temperature of about 335° F. in a liquor containing about 2% to 3% sodium carbonate, about 2% sodium sulphide, and about 1% to 2% sodium sulphite, thereby producing a strong, long-fibered, easily bleachable pulp.

GEORGE A. RICHTER.